[19] United States Patent
Tsujimoto et al.

[11] 3,914,776
[45] Oct. 21, 1975

[54] SHUTTER CONTROL DEVICE
[75] Inventors: Kayoshi Tsujimoto, Osaka; Kintaro Yata, Ikeda; Yoshifusa Fujii, Kaizuka; Hiroshi Ueda, Nara; Motonobu Matsuda, Sakai, all of Japan
[73] Assignee: Minolta Camera Kabushiki Kaisha, Osaka, Japan
[22] Filed: June 11, 1970
[21] Appl. No.: 45,378

[30] Foreign Application Priority Data
June 17, 1969 Japan.............................. 44-48089
Aug. 29, 1969 Japan.............................. 44-68754

[52] U.S. Cl. .................................................. 354/51
[51] Int. Cl.² ................................................ G03B 7/08
[58] Field of Search............. 95/53 E, 53 EA, 10 C; 354/50, 51, 60 R, 23 R

[56] References Cited
UNITED STATES PATENTS
3,324,779 6/1967 Nobusawa et al................ 95/10 C X
3,504,611 4/1970 Richter et al...................... 95/10 X
3,593,629 7/1971 Rentschler............................. 95/10
3,611,893 10/1971 Starp...................................... 95/10

Primary Examiner—Joseph F. Peters, Jr.
Attorney, Agent, or Firm—Watson, Cole, Grindle & Watson

[57] ABSTRACT

A shutter control device comprises three timing circuits and a switching circuit, and in a first timing circuit a first capacitor is charged by photoconductive current generated by a photoconductive cell. The switching circuit is controlled by the voltage of the first capacitor. A second timing circuit has a second capacitor the charging of which is actuated by the switching circuit simultaneously with the actuation of the first timing circuit and is charged as a function of the delay of the first timing circuit. A third timing circuit has a third capacitor and a shorting switch opened in response to the shutter opening after the first capacitor is charged to a predetermined level. The switching circuit triggers shutter closing through an electromagnet when the third capacitor is charged to the voltage equal to that of the second capacitor.

11 Claims, 15 Drawing Figures

F I G. 8
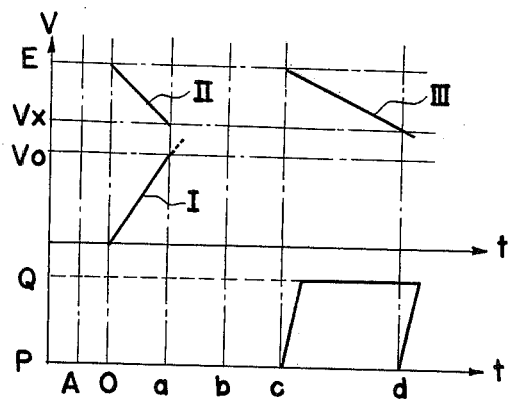
F I G. 9
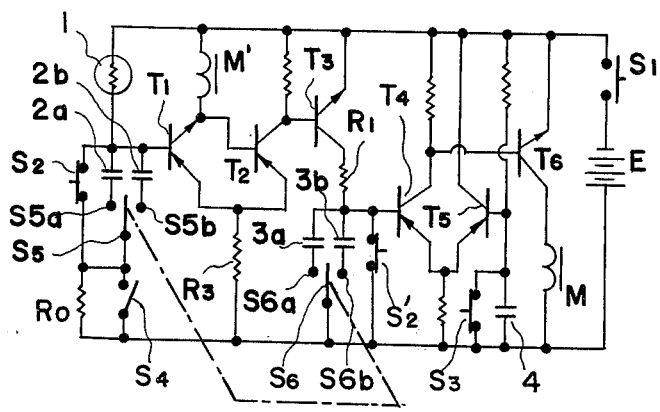
F I G. 10
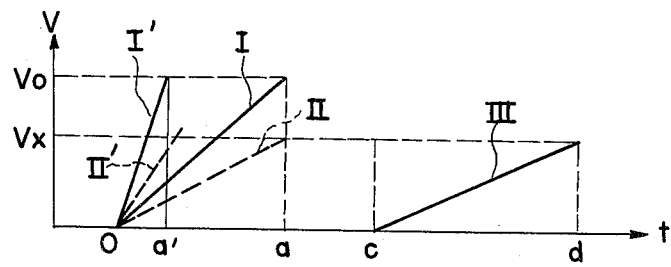

F I G. 11
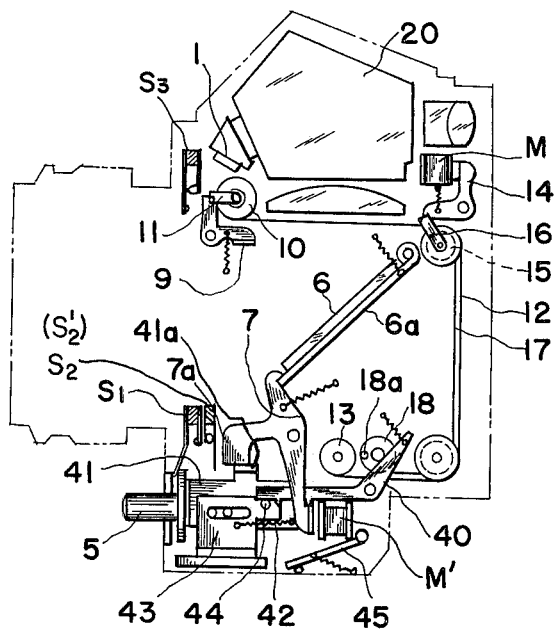
F I G. 12    F I G. 13
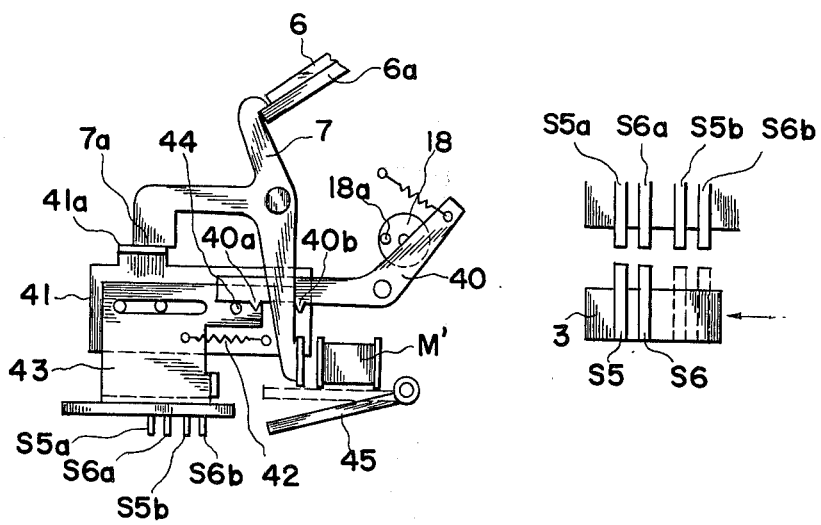

F I G. 14
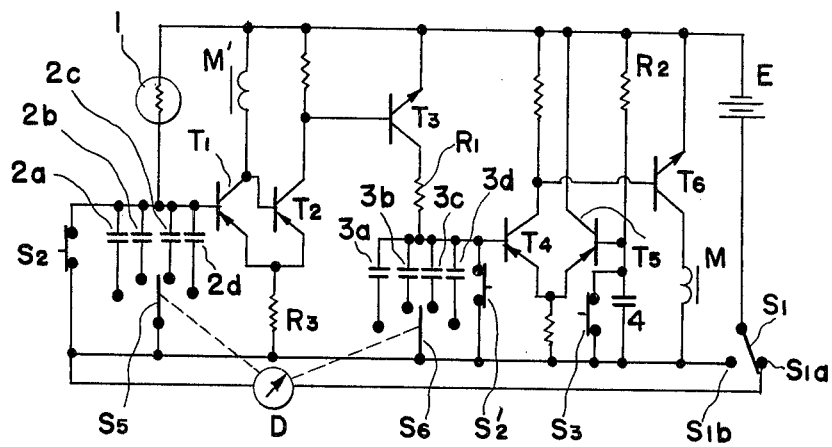
F I G. 15
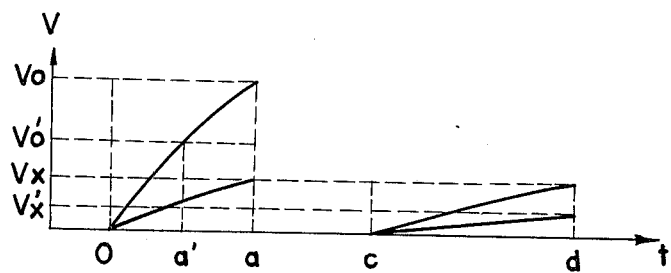

SHUTTER CONTROL DEVICE

BACKGROUND OF THE INVENTION

A shutter in a camera wherein a light responsive element is exposed to light through an objective lens operates from the exposure output voltage of an electric delay circuit with a light responsive conversion element corresponding to the brightness of objects. However, it has been difficult to obtain a voltage with a high energy degree of accuracy in response to a wide range of object brightness.

The inventors have designed an electrical shutter which, without using a stored voltage in response to brightness of objects, controlled exposure by actuating two timer circuits after estimating adequate exposure time based on the photometric value measured prior to exposure. The invention was filed June 2, 1970, Serial No. 42,725. In that invention a second timer is actuated to operate the closing motion of the shutter opening/closing member at the instant when adequate exposure time is completely estimated by a photometric circuit prior to exposure in response to the brightness of objects. In such circuitry there is difficulty with dark objects in actuating the second timer circuit before an adequate exposure time corresponding to brightness of objects can be obtained because it takes time to start the shutter opening/closing member.

SUMMARY OF THE INVENTION

The present invention relates to an electrical shutter device which comprises a photometric or first timing circuit including a first capacitor to estimate adequate exposure time prior to expsoure and a second capacitor charged or discharged at a constant rate during the aforementioned time interval, and which controls motion of the shutter opening/closing member when the charged voltage of the second capacitor a third voltage of capacitor equals the charged or discharged at a constant rate upon opening of the shutter opening/closing member.

The first object of the present invention is to provide an electrical shutter control device which makes it possible to choose a suitable time between shutter releasing operation and the operation of the shutter opening/closing member in accordance with the contraction or expansion of a time interval determined by the brightness of the object.

The second object of the present invention is to provide an electrical shutter control device which is adaptable to any speed of shutter releasing operation.

The third object of the present invention is to provide an electrical shutter control device which has a variable coefficient of time exposure in accordance with the brightness of objects.

The further objects of the present invention will become clear from the detailed description taken in conjunction with the drawing.

BRIEF DESCRIPTION OF THE DRAWINGS

FIG. 8 is a time-chart illustrating motion of an electrical shutter with the electrical controlling circuit showin in either FIG. 6 or FIG. 7.

FIG. 9 is a circuit diagram of an electrical shutter in accordance with the fourth embodiment of the present invention which makes it possible to select capacitors.

FIG. 10 is a time-chart illustrating motion of the electrical shutter in FIG. 9.

FIG. 11 is a sectional side view illustrating an embodiment of a focal plane shutter type camera using the electrical controlling circuit shown in FIG. 9.

FIG. 12 is an enlarged side view of a releasing mechanism usable in the above mentioned embodiments.

FIG. 13 is a partial top view of FIG. 12.

FIG. 14 is a circuit diagram of an electrical shutter in accordance with the fifth embodiment of the present invention in which capacitors are switched in stages.

FIG. 15 is a time-chart illustrating motion of an electrical shutter of another embodiment of the present invention.

DESCRIPTION OF THE PREFERRED EMBODIMENT

In the following figures corresponding parts in various embodiments are designated by identical notations.

Figure 1:
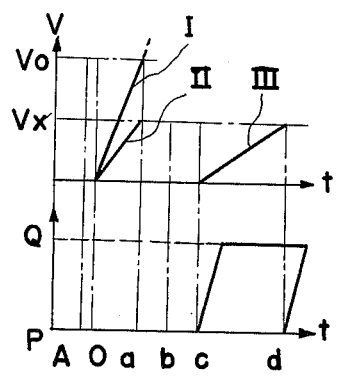
FIG. 1 is an explanatory time-chart showing the action of an electrical shutter of the present invention in relation to the charged voltage of capacitors.
Figure 2:
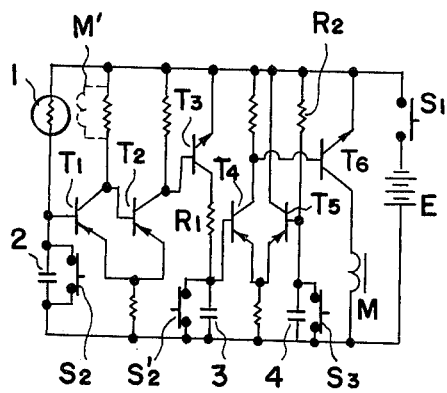
FIG. 2 is a circuit diagram of an electrical shutter of the first embodiment of the present invention.
Figure 3:
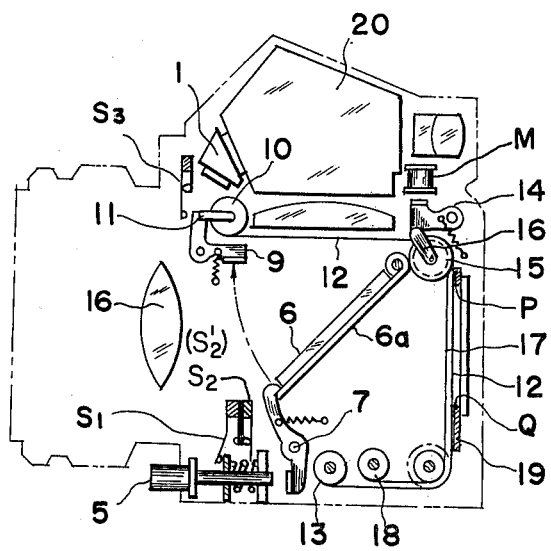
FIG. 3 is a sectional view of a camera with a focal plane type electrical shutter using the electrical controlling circuit shown in FIG. 2.

FIG. 1 is a time-chart showing the motion of an electrical shutter as when a focal plane shutter shown in FIG. 3 is controlled by an electrical controlling circuit of the charging capacitor type shown in FIG. 2 due to the present invention. The abscissa represents time and the upper part of ordinate shows the voltages of the capacitors, while the lower part of ordinate shows the position of the shutter.

Point A in the figure is the time when the shutter release button is depressed, point O is the instant when the main switch is closed by further depression of the release button, point a is the instant when the first timing circuit measures the time corresponding to the brightness of objects, point b the instant when the mirror is unlocked by further depression of the release button, point c is the instant when the locking member for opening the screen is unlocked at the end of the rotating motion of the mirror, and point d the instant when the locking member for the closing member is unlocked.

Referring now to FIG. 3, if release button 5 is pressed, main switch S is first closed at the instant O, and then capacitor 2 shown in FIG. 2 starts to charge by the current flowing through photo-conductive electric element 1 attached to a pentaprism 20. At the same time capacitor 3 starts to charge constant rate by the current flowing through resistance $R_1$ via conductive transistor $T_3$. At the instant a when the condenser 2 is charged to the predetermined voltage $V_o$, transistor $T_1$ and $T_2$ forming a Schmidt circuit are inverted and transistor $T_3$ is also inverted to be non-conductive, thereby the charging of the first condenser 3 to voltage $V_x$ at that time.

By pressing, the release button 5 further as shown in FIG. 3 it strikes a locking lever 7 engaging with mirror 6 at the instant b, and causes mirror 6 to swing counterclockwise, unlocking a movable frame 6a of mirror 6 at the instant b, and mirror 6 rotates by a spring force not shown from an oblique position of 45 degree with the focal axis of objective lens 16 to strike opening screen locking lever 9. In the condition where the shutter is charged as shown in FIG. 3, the opening screen locking lever 9 engages with a locking arm 11 to lock the opening screen 12 which is wound on a winding-up axle 10 over winding-back axle 13. Being struck by mirror 6, an opening screen locking lever 9 swings counterclockwise thereby ending its engagement with a locking arm 11, then the opening screen 12 is released at the instant c and exposure starts from P to Q of an exposure window 19. At the same time, switch $S_3$ is opened by opening screen locking lever 9, thereby the second condenser 4 which has been in the short-circucited state starts to charge with the current flowing through resistance $R_2$.

In FIG. 2 transistor $T_4$ and $T_5$ are connected as a comparison circuit and connected to a power source E where the voltage $V_x$ of the first capacitor 3 is provided to the base of the transistor $T_4$, while the voltage of r the second capacitor 4 is provided to the transistor $T_5$, and both voltages are compared with each other. When the two voltages become equal at the instant d, the output of the differential amplifier inverts transistor $T_6$ making it conductive, thereby causing exciting current to flow into a coil of an electromagnet M which is connected to the transistor circuit. Then the excited electromagnet M in FIG. 3 pulls an armature fixed to a closure locking lever 14 which swings to unlock its engagement with a locking arm 16 of the closing screen winding-up axle. Accordingly, the closing screen 17 starts its movement due to the traction by winding-back axle 18 and the exposure is completed.

The time interval Ab during which release button 5 is being pressed is approximately 1/50 second in usual hand operation and the first timing circuit has to record the brightness of objects in a time interval O a which is shorter than the interval Ab. Accordingly, if the exposure time cd adequate for determining the brightness of an object is longer than 1/50 second, it is necessary to make the estimated time shorter than the actual exposure time cd and this requirement is met by choosing the capacity of capacitor 4 and the values of resistances $R_1$ and $R_2$.

Figure 4:
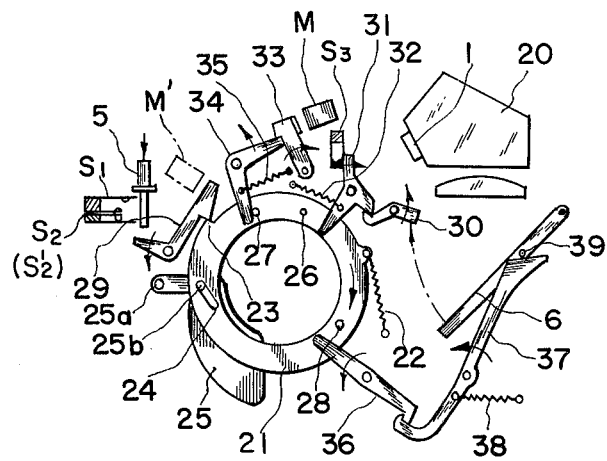
FIG. 4 is an illustration showing the arrangement of a lens shutter type camera.
Figure 5:
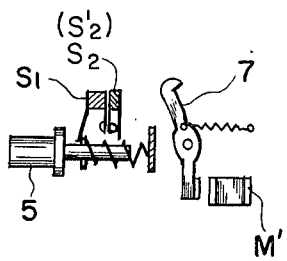
FIG. 5 is an enlarged illustration of the releasing mechanism in a modified type focal plane shutter camera.

FIG. 4 illustrates an embodiment of a single lens reflex camera comprising a lens shutter using the electrical controlling circuit shown in FIG. 2, wherein the shutter mechanism is shown in a front view and the arrangement of the mirror and finder is shown in a side view.

Shutter ring 21 is freely rotatably supported around a tube not shown in the figure and has a clockwise rotating tendency from spring 22. A shutter blade 25, only one being shown for the purposes of the description, is rotatably pivoted on an axis 25a fixed to a base plate not shown, and pin 25b of the blade is inserted in a long slot 24, the blade can be opened or closed by rotation of the shutter ring. The shutter ring 21 has on its circumference a locking step 23 engaging with a releasing lever 29 in the condition of a charged shutter as shown in FIG. 4, and is locked in the most remote counterclockwise position with opening shutter blade 25 against the force due to a spring 22 so as to allow image adjustment by the finder. On the face of the shutter ring 21 is fixed a mirror unlocking pin 28, an opening driven pin 26, and a closing driven pin 27.

The releasing lever 29 is freely rotatably pivoted on the base plate with a clockwise rotating tendency and one of its arms engages with a locking step 23 of the shutter ring 21 as mentioned above, while the other arm lies in the path of release button 5. By pressing the release button 5 the main switch first closes at the instant O, and by further pressing the release button 5 pushes a releasing lever 29 to swing counterclockwise and to release its engagement with the shutter ring 21, which rotates clockwise by a spring 22, followed by closing of shutter blades 25.

At the instant O when the main switch $S_1$ is closed, the charging of capacitors 2 of the photometric circuit and the capacitor starts as 3 shown in FIG. 2, while at the instant a when the capacitor 2 is charged to the predetermined voltage $V_o$, transistor $T_3$ becomes nonconductive, and thereby the second capacitor 3 stops at charging and the voltage $V_x$. This operation is the same as in the case of a focal plane shutter mentioned previously.

In FIG. 4 by the said clockwise rotation of shutter ring 21, its mirror unlocking pin 28 pushes a mirror locking lever 36 to rotate counterclockwise and a mirror driving lever 37, which has been locked by engagement with a mirror locking lever 36, swings counterclockwise by a driving spring 38 to push a pin 39 of the movable frame of mirror 6, and thereby the mirror 6 rotates to the horizontal position from oblique position of 45 degree with the focal axis of the objective lens.

At the instant c, the mirror 6 rotating as mentioned above strikes opening locking lever 30 to swing counterclockwise and consequently unlocks opening driving lever 31 having a clockwise rotating tendency due to a strong spring 32. Then, the opening lever 31 strikes opening driven pin 26 of the shutter ring 21 in a clockwise rotated position, which now rotates counterclockwise against the force to a spring 22 and opens shutter blades 25 which have been momentarily closed. At the same time the clockwise rotation of the opening driving lever 31 opens a switch $S_3$ and the third capacitor 4 starts charging. The voltage of this capacitor is compared in the differential amplifier with the voltage of the second capacitor 3, and at the instant d when both voltages become equal, the output of the differential amplifier makes transistor N $T_6$ conductive and excites an electromagnet M, which then pulls an armature of a closing locking lever 33 clockwise, thereby unlocking a closing driving lever 34 having a counterclockwise rotating tendency due to a strong spring 35.

Simultaneously there with closing driven pin 27 of the counterclockwise rotating shutter ring 21 engages with the unlocked closing driving lever 34 and thereby is pressed clockwise to start the shutter closing stroke and exposure is completed. Switches $S_2$ and $S_2'$ are discharging switches for capacitors 2 and 3 respectively, closure of which may be used to control the start of charging at the instant O. In case of the embodiments shown in FIG. 2 and FIG. 3 the time interval from O to b is estimated depending on the speed of pressing the release button 5, and hence if the time interval is required to be constant the arrangement can be as in FIG.

5, wherein a coil of an electromagnet M' shown in FIG. 2 by a dashed line is inserted into the collector of the first stage transistor $T_1$ which becomes conductive when capacitor 2 reaches the predetermined voltage $V_o$, and thereby mirror locking lever 7 is operated.

Figure 6:
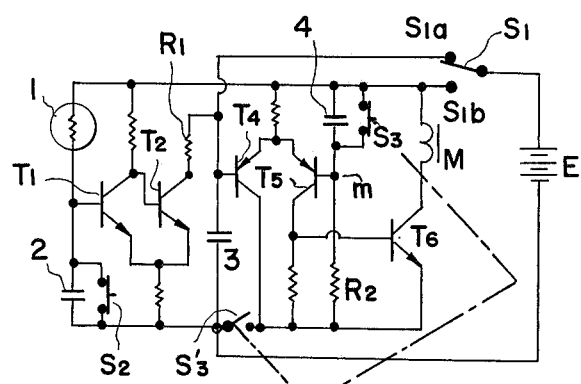
FIG. 6 is a circuit diagram of an electrical controlling circuit in accordance with the second embodiment of the present invention.
Figure 7:
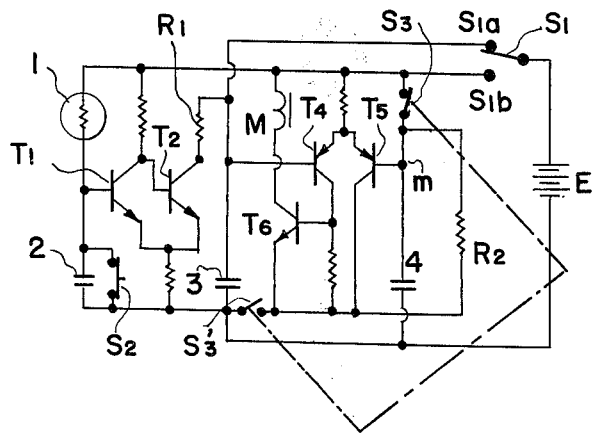
FIG. 7 is a circuit diagram of the third embodiment of an electrical controlling circuit.

In the embodiment described so far the charged voltage of the second capacitor 3 is compared with that of the third 4, and the closing stroke of the shutter opening/closing member is started at the instant d when the capacitor voltages coincide with each other in the embodiment of a electrical controlling circuit shown in FIG. 6 and FIG. 7, the closing stroke of the shutter opening/closing member is started by discharging of the second and the third capacitors at the instant when the discharged voltages coincide with each other.

In FIG. 6 the main switch $S_1$ has two contact points $S_{1a}$ and $S_{1b}$, and is set on the side of the contact point $S_{1a}$ before the releasing operation, thereby charging in advance capacitor 3 by a power source E, while switch $S_3'$ is closed synchronously with the opening of a short-circuited switch $S_3$ of capacitor 4. At the instant O in FIG. 8 the switch $S_1$ is changed over to the contact point $S_{1b}$ and consequently capacitor 2 is charged at a rate in proportion to the brightness of object (Curve I in FIG. 8.) At the same time the second capacitor 3 discharges through resistance $R_1$ (Curve II in FIG. 8) since a transistor $T_2$ is at first in a conductive condition in a Schmidt circuit composed of transistor $T_1$ and $T_2$, then at the instant when the charged voltage of the capacitor 2 reaches Vo, the Schmidt circuit is inverted, the transistor $T_2$ becomes non-conductive, and the second capacitor 3 ceases discharging.

On the other hand at the instant c when the shutter starts opening, switch $S_3$ opens while switch $S_3'$ closes, and the third capacitor 4 begins charging via resistance $R_2$. In this case the output terminal m of the third capacitor 4 is negative. The voltage of the terminal m decreases approximately linearly from voltage E as shown by Curve III in FIG. 8, and is compared by a level detector composed of transistors $T_4$ and $T_5$ with the terminal voltage $Vx$ of the second capacitor 3. At the instant d when the voltage of terminal m of the third capacitor 4 reaches $Vx$, transistor $T_6$ becomes conductive, electric current flows through an electromagnet M, and then the closing stroke of the shutter opening/closing member is started.

In the embodiment shown in FIG. 7 the third capacitor 4 is already charged to voltage E when the main switch $S_1$ is changed over to contact point $S_{1b}$ at the instant O shown in FIG. 8. When switch $S_3$ opens at the instant c, capacitor 4 starts discharging via resistance $R_2$, and the voltage at terminal M decreases along the Curve II in FIG. 8. When the voltage coincides with the voltage of the second capacitor 3, the output of the differential amplifier inverts transistor $T_6$ to be conductive and excites electromagnet M, thereby starting the closing stroke of the shutter opening/closing member.

The above embodiments are extremely effective as mentioned before in the case of a long exposure time which adequate for the brightness of objects. It becomes rather difficult for such an electrical controlling circuit to obtain an exposure having a high degree of accuracy, when the brightness of objects is high, for instance, the corresponding adequate exposure time is as short as 1/200 second. One of the devices to overcome this difficulty is the fourth embodiment of an electrical controlling circuit shown in FIG. 9. FIG. 10 is a time-chart and FIG. 11 is an embodiment of a focal plane shutter provided with the electrical controlling circuit shown in FIG. 9.

In the circuit of FIG. 9, the release button 5 is pressed at the instant A, the main switch $S_1$ is closed at the instant O, the brightness of the object is detected by photo-conductive electric element 1 and prescribed resistance Ro, and the detected voltage is fed to the base of a transistor $T_1$. If the brightness of the object is higher than the predetermined level, the transistor $T_1$ becomes conductive and an electromagnet M' is excited. Then the electromagnet M' pulls and rotates clockwise a constraining plate 45 against its spring, and simultaneously tries to rotate mirror locking lever 7 counterclockwise, but the rotation is hindered since the arm 7a lies on a sliding contact plane 41a of releasing lever 41 which moves together with the release button 5. As shown in detail by FIG. 12, a circuit switch-over plate 43 is connected to and follows the motion of the releasing lever 41 via a spring 42. If constraining plate 45 is rotated, the circuit switch-over plate 43 is prevented from its rightward motion as it is coupled with the releasing lever 41.

On circuit switch-over plate 43 are attached lugs of change-over switch-over switch $S_5$ and $S_6$ as shown in FIG. 13, wherein according to the displacement of the circuit switch-over plate 43 the change-over switch $S_5$ is connected to one of fixed contact point $S_{5a}$ and $S_{5b}$ and the change-over switch $S_6$ to one of fixed contact points $S_{6a}$ and $S_{6b}$.

Consequently, if the objects are brighter than the predetermined level, the change-over switch $S_5$ and $S_6$ are connected to the contact points $S_{5b}$ and $S_{6b}$ respectively since the rightward displacement of the circuit switch-over plate 43 is hindered by the corresponding plate 45, while if the brightness of the objects is below the predetermined level, the changeover switches $S_5$ and $S_6$ are connected to the fixed contact points $S_{5b}$ and $S_{6b}$ respectively since the rightward displacement of the circuit switch-over plate 43 is no longer hindered by the constraining plate 45. To the contact point $S_{5a}$ is connected a capacitor 2b of comparatively large capacity which in turn is connected in series with a photoconductive element 1, and similarly to the contact point $S_{5b}$ is connected a capacitor 2b of comparatively small capacity. In the same way two capacitors 3a and 3b are connected in series to a transistor $T_3$ and a resistance $R_1$, where the capacity of the capacitor 3a is larger than that of 3b and the capacitor 3a is connected to the contact point $S_{6a}$ and the capacitor 3b to the contact point $S_{6b}$. The charging curves for the capacitor 2a, 2b, 3a, and 3b are given by the Curves I, I', II and II' in FIG. 10 respectively.

V type lever 40 having locking lugs 40a and 40b serves to prevent turnover of the change-over switches $S_5$ and $S_6$ when the releasing operation is suspended during exposure control operation. When the circuit switch-over plate 43 is pressed by the releasing operation, the said locking lugs 40a or 40b engages with locking pin 44 and prevents its returning. When the closing screen winding-back axle 18 starts winding after completion the exposure control, pin 18a contacts with and rotates clockwise the V type lever 40 against a force due to a spring, thereby removing the engagement of the locking pin 44 with the locking lugs 40a or 40b and allowing leftward displacement of the circuit changeover plate 43.

By pressing the release button 5 further a switch $S_4$ not shown in FIG. 11 is closed and, at the instant O when short-circulated switches $S_2$ and $S_2'$ are opened, the capacitor $2a$ or $2b$ of the photometric circuit and the second capacitor $3a$ or $3b$ start charging, while an electromagnet $M'$ ceases operation. When the voltage of capacitor $2a$ or $2b$ of the photometric circuit reaches $V_o$ in FIG. 10, transistor $T_1$ becomes conductive for exciting the electromagnet $M'$ once again, while transistors $T_2$ and $T_3$ become non-conductive and thereby the second capacitor $3a$ or $3b$ stops charging. The time shown by $\overline{oa}$ or $\overline{oa}'$.

Finally when pressing the release button to the end of its travel a mirror locking lever 7 terminates its engagement at the arm with a sliding contact plane $41a$ of releasing lever 41, and consequently swings counterclockwise by the pulling force of the electromagnet $M'$. Thus the opening screen 12 starts its movement at the instant $c$. At the same time, a short-circuiting switch $S_3$ is opened and the third capacitor 4 starts charging, of which the voltage at the terminal $m$ is provided to transistor $T_5$, while transistor $T_4$ receives the voltage $V_x$ of the second capacitor $3a$ or $3b$. The two voltages are compared with each other and when the voltages coincide, an electromagnet M is excited and closing screen locking lever 14 is unlocked at the instant $d$. This situation is similar to the first embodiment.

In the fifth embodiment of the present invention shown in FIG. 14, a capacitor of the first timing circuit as well as the second described in the above embodiment are designed to be changed-over a multi-stage, configuration where the capacitor of the first timing circuit is composed of four capacitors $2a$, $2b$, $2c$, and $2d$, similarly the second capacitor comprises a group of capacitors $3a$, $3b$, $3c$, and $3d$. The change-over in each group of capacitors is performed by an exposure meter D connected in series to a power source E and a photoconductive element 1 before the releasing operation. Main switch $S_1$ comprising two contact points $S_{1a}$ and $S_{1b}$ is on the contact point $S_{1a}$ before operation of the release button, and electric current corresponding to the brightness of the objects is obtained by the exposure meter D, of which motion of the indicating needle is followed by a change-over switch $S_5$ which is to be connected to one of contact points of a capacitor group of the first timing circuit and also followed by a change-over switch $S_6$ to be connected to one of the contact points of the second capacitor group. According to the brightness of the object the change-over switches $S_5$ and $S_6$ are connected one of capacitors $2a$ through $2d$ and to one of capacitors $3a$ through $3d$, respectively. In the present embodiment, therefore, resistance $R_o$ is not connected in series to a photoconductive element 1 for detecting brightness.

In the course of further releasing operation main switch $S_1$ is turned to the contact point, $S_{1b}$, and the process thereafter advances approximately in the same way as in the case of the fourth embodiment. The releasing lever in the present embodiment, however, does not need a circuit switch-over plate, it is sufficient that an electromagnet $M'$ unlocks a mirror locking lever 7.

In the said fourth and fifth embodiments, the ratio of the exposure time adequate for the brightness of objects to the time measured by a photometric circuit is chosen by changing the capacity of the capacitors but the ratio can be changed alternatively by adjusting the predetermined voltage $V_o$ in FIG. 10. This can be realized providing: a variable bias resistance $R_3$ to the transistors $T_1$ and $T_2$ composing a Schmidt circuit in FIG. 9 and FIG. 10, and together with the variation resistance $R_1$ and $R_2$ for charging or discharging the second capacitor group and the third capacitor 4 and switched-over. The time-chart is given in FIG. 15.

A further modification is also possible: In FIG. 9 the resistance $R_o$ for detecting the brightness of objects is made variable and regulated by a motor rotating forwardly or backwardly around the position determined by the equilibrium condition of a photometric bridge circuit, the change-over switches $S_5$ and $S_6$ are adjusted by the movement of the motor, thus the circuit is switched-over by the position at which the motor stops.

We claim:

1. A shutter opening and closing device for a photographic camera including a shutter opening mechanism, a shutter closing mechanism, and a light responsive element normally exposed to scene light through an objective lens of the camera and unexposed to the light while said shutter mechanisms are in operating condition, comprising:

a first timing circuit including a first capacitor charged by current generated by said light responsive element;

a switching circuit having an input connected to said first capacitor to be switched when said first capacitor is charged to a predetermined voltage;

a second timing circuit having a second capacitor and controlled by said switching circuit to charge to a voltage determined by said first timing circuit;

a manually operable switch means for initiating the charging of said first and second capacitors simultaneously;

a releasing member manually operable for actuating said switch means and then sequentially releasing said shutter opening mechanism;

a third timing circuit having a third capacitor;

an operating switch connected across said third capacitor and opened in response to the release of said shutter opening mechanism;

means for actuating said shutter closing mechanism;

means for comparing the terminal voltages of said second capacitor and the third capacitor and triggering said means for actuating said shutter closing mechanism when said third capacitor is charged to substantially the same voltage as said second capacitor.

2. A shutter control device as in claim 1, wherein said first capacitor is selected to make the delay of said first timing circuit shorter than the actual exposure time determined by said third timing circuit.

3. A shutter control device as in claim 1, wherein said first capacitor is selected to make the delay of said first timing circuit longer than the actual exposure time determined by said third timing circuit.

4. A shutter control device as in claim 1, further comprising means for short-circuiting said second capacitor prior to the charging thereof and said second capacitor is charged by said switching circuit during the delay period of said first timing circuit.

5. A shutter control device as in claim 1, further comprising a power source for charging said second capacitor and said second capacitor is discharged by said switching circuit during said delay period of the first timing circuit.

6. A shutter control device as in claim 1, wherein said first and second timing circuits each include a plurality of alternatively selectable capacitors for a plurality of delay periods to be selected in accordance with the light conditions of a scene to be photographed.

7. A shutter control device as in claim 6, further comprising a pointer positioned in response to the intensity of light incident on said photoelectric cell, and means associated with said pointer for selecting one of said plurality of capacitors.

8. A shutter control device as in claim 1, wherein said first timing circuit includes a fourth capacitor having a higher capacitance than said first capacitor for providing a longer delay period than the actual exposure time, said second timing circuit includes a fifth capacitor having a higher capacitance than said second capacitor, and further comprising switching means associated with said first and second timing circuits for connecting said first and second capacitors or said fourth and fifth capacitors in said respective first and second timing circuits in accordance with the intensity of scene light.

9. A shutter control device as in claim 8, wherein said switching means includes:

a voltage divider having said light responsive element and a fixed resistance connected in series therewith, first, second, third and fourth fixed contacts respectively connected to said first, second, fourth and fifth capacitors, first and second movable contacts, means for moving said first and second movable contacts respectively into contact with said first and fourth contacts and said second and fifth contacts, a second switching circuit controlled by said voltage divider for actuating said means for moving in response to scene light.

10. A shutter control device as in claim 1, further comprising means for triggering the shutter opening mechanism when said first capacitor is charged to a predetermined level.

11. A shutter control device as in claim 1, further comprising means for controlling the charging level of said first capacitor.

* * * * *